United States Patent Office 3,450,681

Patented June 17, 1969

1

3,450,681

CURABLE ACRYLATE INTERPOLYMERS CONTAINING ALKOXYETHYL OR ALKYLTHIOETHYL ACRYLATES

Riad H. Gobran, Levittown, and Philip Bernstein, Yardley, Penn., assignors to Thiokol Chemical Corporation, Bristol, Pa., a corporation of Delaware No Drawing. Filed May 22, 1967, Ser. No. 640,367

Int. Cl. C08f 15/40, 45/72

U.S. Cl. 260—80.72 18 Claims

ABSTRACT OF THE DISCLOSURE

Curable acrylate elastomers are based on acrylate interpolymers prepared from butyl acrylate, alkoxyethyl or alkylthioethyl acrylate, and at least one other comonomer providing active cure sites, such as halogen groups, epoxy groups, or ethylenically unsaturated groups.

BACKGROUND OF THE INVENTION

This invention relates to curable acrylate interpolymers containing active cure sites which may be cured to produce vulcanized acrylate rubbers.

Curable acrylate-based polymers have long been known and have found use, upon cure, as gasketing materials for sealing lubricants, coolants and other liquids in devices such as automotive transmissions and pumps. The oily liquids and high operating temperatures of such devices require low volume swell properties at these high temperatures in the cured rubbers used therein. Acrylate rubbers having these properties have been prepared but they suffer from the disadvantage of not having a low enough embrittlement temperature to permit their use at temperatures of below about −30° F. and especially below about −40° F. Other acrylate rubbers have been prepared which do have a very low embrittlement temperature but they do not have good oil resistance.

The cured acrylate rubbers prepared according to the present invention combined good oil resistance and excellent low temperature properties while still maintaining the desirable mechanical properties of cured acrylate rubbers.

SUMMARY

This invention relates to curable elastomeric acrylate compositions contaning interpolymers of (A) butyl acrylate (B) alkoxyethyl acrylate or alkylthioethyl acrylate or mixtures thereof and (C) at least one co-polymerizable vinyl monomer containing active cure sites selected from the group consisting of epoxy, halogen, and ethylenically unsaturated groups. The invention also relates to the cured elastomers prepared from the above-mentioned interpolymers.

The cured elastomers of the present invention are characterized by a combination of good oil resistance (less than 50% swell and preferably less than 40% swell in ASTM No. 3 oil as measured by ASTM D471–64) good physical properties and excellent low temperature properties (an embrittlement temperature lower than about −30° F. and preferably lower than about −40° F.), which combination makes them particularly useful for oil seals and the like which are used at high operating temperatures but which do not become brittle at very low temperatures. In addition, the use of a large proportion of the readily available inexpensive butyl acrylate makes them commercially feasible products.

2

DESCRIPTION OF THE PREFERRED EMBODIMENTS

In general, the interpolymers of the present invention may be formed by free radical suspension or emulsion polymerization using conventional peroxide, persulfate or azo type intiators. Benzoyl peroxide and azobisisobutyronitrile are the preferred initiators. The monomers are charged to a reaction vessel containing water and a suspending or emulsifying agent. The initiator is then added either in its entirety, in increments or continuously. Adjuvants which facilitate handling or processing may be added at this time also. Polymerization is then permitted to proceed, usually aided by heating and agitation, until the desired interpolymers have formed.

One essential component of the interpolymers of the present invention is an alkoxyethyl acrylate or alkylthioethyl acrylate in about 20 to <50 and preferably about 37 to 43 parts by weight per hundred parts by weight of the total polymerizable monomers. The alkoxyethyl acrylate and alkylthioethyl acrylate correspond to the general formula

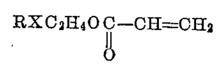

$$RXC_2H_4OC(=O)-CH=CH_2$$

wherein R is methyl or ethyl and X is O or S.

A second essential component of the interpolymers of the present invention is a copolymerizable monomer containing active cure sites. These cure sites may be classified generally in the following three groups: (1) halogen, (2) epoxy, (3) ethylenic unsaturation.

Typical monomers providing cure sites belonging to the first group are the active halogen containing monomers disclosed in U.S. 2,600,414, col. 3, lines 36–46. Representative members of this group are chloroethyl vinyl ether, chloroethyl acrylate, 4-chloro-2-butenyl acrylate and vinyl chloroacetate.

Typical monomers providing cure sites belonging to the second group are the epoxy compounds listed in co-pending application U.S. S.N. 319,641 filed Oct. 29, 1963, now Patent No. 3,312,677. Representative members of this group are allyl glycidyl ether, glycidyl acrylate and glycidyl methacrylate.

Typical monomers providing cure sites belonging to the third group are the non-conjugated polyenes having double bonds of unequal reactivities, such as dicyclopentadiene, and vinyl cyclohexene.

The co-polymerizable monomer providing active cure sites may be used in the proportions listed below per 100 parts by weight of the total polymerizable monomers depending upon the types of cure site provided:

(1) active halogen—about 2 to 10 parts by weight
(2) epoxy—about 1 to 10 parts by weight
(3) ethylenic unsaturation—about 0.5 to 10 parts by weight.

The incorporation of active cure sites makes possible the rapid (5–15 minutes) cures commercially desirable for molded acrylate elastomer products.

A third essential component of the interpolymers of the present invention is butyl acrylate in about 50 to 80 parts, preferably about 57 to 63 parts by weight per hundred parts of total polymerizable monomers. Butyl acrylate is known to form copolymers and homopolymers having good low temperature flexibility but poor oil resistance. It was unexpected to discover that acrylate elastomers prepared from alkoxyethyl or alkylthioethyl acrylates could contain as much as 80% of butyl acrylate as a co-monomer without unduly impairing the good oil resistance of these elastomers. A portion of the butyl acrylate may be replaced by ethyl acrylate, but this amount should not exceed about 20 parts.

If desired for specific purposes, other co-polymerizable monomers may be incorporated in the interpolymers of the present invention in amounts that do not interfere with the abovementioned requirements of the three essential components of the interpolymers. One example of such a copolymerizable monomer is acrylonitrile which tends to increase the oil resistance of the polymer and may be added in amounts up to about 10% by weight of the total monomer charge. Other copolymerizable monomers are polyenes containing at least two double bonds having approximately the same reactivity such as divinyl benzene, allyl methacrylate, allyl acrylate, ethylene glycol diacrylate, diethylene glyco diacryate, polyethyene glycol diacrylate which produce a small amount of cross-linking during polymerization and thus improve the ease of handling on a rubber mill and during molding. These are preferably used in amounts ranging from 0.05 to 5% of the total monomer charge.

The acrylate interpolymers of this invention may be admixed with conventional rubber compounding ingredients such as vulcanizing agents and accelerators, reinforcing agents, fillers, pigments, plasticizers and the like to provide synthetic rubbers with various properties. The particular vulcanizing agent chosen will depend upon the nature of the active cure site in the interpolymer. For example, typical vulcanizing agents for the three different types of active cure sites are listed below:

| Active cure site | Vulcanizing agents |
|---|---|
| Halogen | Sulfur; quinone derivatives such as quinone dioxime; dinitrobenzene; peroxides such as benzoyl peroxide; amines such as triethylene tetramine. |
| Epoxy | Decomposable ammonium salts such as ammonium benzoate; polycarboxylic acids and anhydrides such as pyromellitic dianhydride; metal salts of dithiocarbamic acids; soap/sulfur; thiuram sulfides; amine salts of substituted carbamic acids. |
| Ethylenic unsaturation | Sulfur; peroxides such as benzoyl peroxide; rubber accelerators such as sulfenamides, guanidines, thiuram sulfides, thiazolines, etc. |

The following examples illustrate the invention but are not intended as a limitation upon the scope thereof.

Example 1

Two batches of an interpolymer of 57 parts of butyl acrylate, 40 parts of methoxyethyl acrylate, 3 parts of allyl glycidyl ether, and 0.15 part of allyl methacrylate was prepared as follows: to a mixture of 1500 ml. of water and 28.8 g. of Alcogum (15% solution of the sodium salt of polyacrylic acid) heated to 75° C. was added a monomer charge of 285 g. of butyl acrylate, 200 g. of methoxyethyl acrylate, 15 g. of allyl glycidyl ether and 0.75 g. of allyl methacrylate and the entire mixture heated to reflux. Then 1.6 ml. of a catalyst solution consisting of 0.275 g. of azobisisobutyronitrile dissolved in 25 ml. of benzene was added, followed by five successive additions of 1.28 ml. of catalyst solution at 22 minute intervals. The reaction mixture was cooled, the polymer filtered, washed with water and dried overnight at 60° C. under vacuum yielding 307 g. in one batch and 288 g. in another batch. The two batches were combined and used in preparing the following formulations where the quantities given are in parts by weight. The Mooney viscosity at 212° F. of the uncured polymer was 32. The curable mixtures were all cured for 5 min. at 340° F. and tempered for 5 hours at 350° F.

A masterbatch was prepared as follows:

| | |
|---|---|
| Polymer blend | 900 |
| Philblack A carbon black | 540 |
| Stearic acid | 9 |
| Polymerized trimethyl dihydroquinoline | 13.5 |

Four curable mixtures were prepared from the masterbatch as follows:

| | A | B | C | D |
|---|---|---|---|---|
| Masterbatch | 325 | 325 | 325 | 325 |
| Hexamethylenediamine carbamate | 2 | | | |
| Zinc dimethyl dithiocarbamate | | 4 | | |
| Ammonium benzoate | | | 10.6 | |
| Tetramethyl thiuram disulfide | | | | 4 |
| Zinc oxide | | | | 2 |
| Properties: | | | | |
| Mooney scorch at— | | | | |
| 250° F. (min.) | 18/30+ | 28/30+ | 10/18 | 30+/30+ |
| 350° F. | 5/7 | 4/6.5 | 2/2.5 | 5.5/7 |
| Compression set, percent after 22 hrs./302° F. | 29 | 45 | 26 | 45 |
| $G_{10,000}$ ° F. | −44 | −44 | −45 | −44 |
| Percent swell in ASTM No. 3 oil | 32 | 33 | 38 | 32 |
| Hardness after oil immersion test (Shore A) | 49 | 43 | 43 | 44 |
| Tempered physicals: | | | | |
| Tensile, p.s.i. | 1,000 | 1,250 | 1,230 | 1,200 |
| Elongation, percent | 125 | 180 | 185 | 200 |
| Hardness, Shore A | 49 | 43 | 43 | 44 |
| After heat aging 70 hrs. at 350° F. on aluminum block: | | | | |
| Tensile, p.s.i. | 905 | 420 | 635 | 440 |
| Elongation, percent | 115 | 55 | 100 | 45 |
| Hardness, Shore A | 72 | 75 | 71 | 77 |

Example 2

The same procedure and quantities as in Example 1 except for monomer charge were used to prepare an interpolymer of butyl acrylate (300 g.), methylthioethyl acrylate (200 g.), chlorovinyl acetate (20 g.), and allyl methacrylate (22 drops). A yield of 335 g. of dried polymer was obtained. Elemental analysis indicated that the polymer composition was 56 parts of butyl acrylate 40 parts of methylthioethyl acrylate and 4 parts of vinyl chloroacetate. The polymer was used in the following formulation (parts by weight) which was cured for 10 min. at 340° F. and tempered for 5 hours at 350° F.

| | |
|---|---|
| Polymer | 100 |
| Philblack A carbon black | 60 |
| Stearic acid | 1 |
| N-phenyl-beta-naphthylamine | 2 |
| Sodium stearate | 5 |
| Sulfur | 0.5 |
| Mooney viscosity (polymer): | |
| At 212° F. | 44 |
| At 295° F. | 37 |
| Mooney Scorch at 250° F. (min.) | 4/7 |
| Compression set percent | 31 |
| $G_{10,000}$ (hexane) ° F. | −42 |
| Percent swell 70 hrs./302° F. ASTM No. 3 oil | 25 |
| Tensile, p.s.i. | 1195 |
| Elongation, percent | 145 |
| 100% modulus, p.s.i. | 760 |
| Hardness, Shore A | 68 |

Example 3

The same procedure and quantities as in Example 1, except for monomer charge, were used to prepare an interpolymer of butyl acrylate (275 g.), methylthioethyl acrylate (200 g.), 2-chloroethyl vinyl ether (12 g.) and allyl methacrylate (44 drops). A yield of 375.4 g. of dried polymer was obtained. The polymer, which had a Mooney viscosity of 47 at 212° F., was used in the following formulation (parts by weight), which was cured for 30′ at 310° F. and tempered for 24 hours at 300° F.

| | |
|---|---|
| Polymer | 100 |
| Philback A carbon black | 40 |
| Stearic acid | 1 |
| Hexamethylenediamine carbamate | 1 |
| Dibasic lead phosphite | 5 |
| Tensile, p.s.i. | 940 |
| Elongation, percent | 75 |
| Percent swell in ASTM No. 3 oil | 32 |
| $G_{10,000}$ ° F. | −34 |

Example 4

The same procedure and quantities as in Example 1, except for monomer charge, were used to prepare an interpolymer of butyl acrylate (300 g.), ethyl acrylate (75 g.), methoxyethyl acrylate (125 g.), allyl glycidyl ether (20 g.) and allyl methacrylate (33 drops). The combined yield from three of the above batches was 836 g. The polymer, which had a Mooney viscosity of 36 at 212° F., was used in the following formulation (parts by weight), which was cured for 10 min. at 340° F. and tempered for 5 hours at 350° F.

| | |
|---|---|
| Polymer | 100 |
| Philblack A carbon black | 60 |
| Stearic acid | 1 |
| Polymerized trimethyl dihydroquinoline | 1.5 |
| Ammonium benzoate | 5.3 |
| Tensile, p.s.i. | 1025 |
| 100% modulus, p.s.i. | 520 |
| Elongation, percent | 160 |
| Hardness (Shore A) | 62 |
| $G_{10,000}$ ° F. | −42 |
| Percent swell in ASTM No. 3 oil | 42 |
| Hardness after immersion | 61 |
| Percent compression set (22 hrs./302° F.) | 30 |

We claim:

1. A curable elastomeric acrylate composition having, when cured, an embrittlement temperature of below about −30° F. and a volume swell in ASTM oil No. 3 of less than about 50% as measured by ASTM D–471–64 and comprising an addition interpolymer having the following composition in parts by weight:

(A) 50 to 80 parts of butyl acrylate;
(B) 0 to 20 parts of ethyl acrylate;
(C) 0 to 10 parts of acrylonitrile
(D) 20 to <50 parts of an acrylate having the general formula

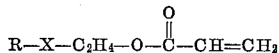

wherein R is methyl or ethyl and X is O or S; and
(E) 0.5 to 10 parts of at least one other vinyl monomer containing an active cure site selected from the group consisting of halogen, epoxy and ethylenically unsaturated groups.

2. A curable elastomeric acrylate composition as in claim 1 which further comprises from 0.05 to 5 parts by weight of a monomer selected from the group consisting of divinyl benzene, allyl methacrylate, allyl acrylate, ethylene glycol diacrylate, diethylene glycol diacrylate and polyethylene glycol diacrylate.

3. A curable elastomeric acrylate composition as in claim 1 in which said active cure site containing monomer is allyl glycidyl ether.

4. A curable elastomeric acrylate composition as in claim 1 in which said active cure site containing monomer is vinyl chloroacetate.

5. A curable elastomeric acrylate composition as in claim 1 in which said active cure site containing monomer is 2-chloroethyl vinyl ether.

6. A curable elastomeric acrylate composition having, when cured, an embrittlement temperature of below about −40° F. and a volume swell in ASTM oil No. 3 of less than about 40% as measured by ASTM D–471–64 and comprising an acrylate addition interpolymer having the following composition in parts by weight:

(A) 57 to 63 parts of butyl acrylate;
(B) 0 to 10 parts of acrylonitrile
(C) 43 to 37 parts of methoxyethyl acrylate or methylthioethyl acrylate or mixtures thereof; and
(D) 0.5 to 10 parts of at least one other vinyl monomer containing an active cure site selected from the group consisting of halogen, epoxy and ethylenically unsaturated groups.

7. A curable elastomeric acrylate composition as in claim 6 which further comprises, from 0.05 to 5 parts by weight of a monomer selected from the group consisting of divinyl benzene, allyl acrylate, allyl methacrylate, ethylene glycol diacrylate, diethylene glycol diacrylate and polyethylene glycol diacrylate.

8. A curable elastomeric acrylate composition as in claim 6 in which said active cure site containing monomer is allyl glycidyl ether.

9. A curable elastomeric acrylate composition as in claim 6 in which said active cure site containing monomer is vinyl chloroacetate.

10. A cured acrylate elastomer having an embrittlement temperature of below about −30° F. and a volume swell in ASTM oil No. 3 of less than about 50% as measured by ASTM D–471–64 and prepared from an addition interpolymer having the following composition in parts by weight:

(A) 50 to 80 parts of butyl acrylate;
(B) 0 to 20 parts of ethyl acrylate;
(C) 0 to 10 parts of acrylonitrile;
(D) 20 to <50 parts of an acrylate having the general formula

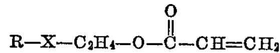

wherein R is methyl or ethyl and X is O or S; and
(E) 0.5 to 10 parts of at least one other vinyl monomer containing an active cure site selected from the group consisting of halogen, epoxy and ethylenically unsaturated groups.

11. A cured acrylate elastomer as in claim 10 which further comprises from 0.05 to 5 parts by weight of a monomer selected from the group consisting of divinyl benzene, allyl methacrylate, allyl acrylate, ethylene glycol diacrylate, diethylene glycol diacrylate and polyethylene glycol diacrylate.

12. A cured acrylate elastomer as in claim 10 in which said active cure site containing monomer is allyl glycidyl ether.

13. A cured acrylate elastomer as in claim 10 in which said active cure site containing monomer is vinyl chloroacetate.

14. A cured acrylate elastomer as in claim 10 in which said active cure site containing monomer is 2-chloroethyl vinyl ether.

15. A cured acrylate elastomer having an embrittlement temperature of below about −40° F. and a volume swell in ASTM oil No. 3 of less than 40% as measured by ASTM D–471–64 and prepared from an acrylate addition interpolymer having the following composition in parts by weight:

(A) 57 to 63 parts of butyl acrylate;
(B) 0 to 10 parts of acrylonitrile;
(C) 43 to 37 parts of methoxyethyl acrylate or methylthioethyl acrylate or mixtures thereof and
(D) 0.5 to 10 parts of at least one other vinyl monomer containing an active cure site selected from the group consisting of halogen, epoxy and ethylenically unsaturated groups.

16. A cured acrylate elastomer as in claim 15 which contains, in addition, from 0.05 to 5 parts by weight of a monomer selected from the group consisting of divinyl benzene, allyl acrylate, allyl methacrylate, ethylene glycol diacrylate, diethylene glycol diacrylate and polyethylene glycol diacrylate.

17. A cured acrylate elastomer as in claim 15 in which said active cure site containing monomer is allyl glycidyl ether.

18. A cured acrylate elastomer as in claim 15 in which said active cure site containing monomer is vinyl chloroacetate.

References Cited

UNITED STATES PATENTS 3,017,396 6/1962 Arond et al.

JOSEPH F. SCHOFER, *Primary Examiner.*

STANFORD M. LEVIN, *Assistant Examiner.*

U.S. Cl. X.R.

260—79.7, 80.76, 80.81